United States Patent

Hobson et al.

[11] Patent Number: 6,065,121
[45] Date of Patent: May 16, 2000

[54] CONTROL OF COMPUTER SYSTEM WAKE/SLEEP TRANSITIONS

[75] Inventors: Louis B. Hobson; John D. Battles, both of Tomball, Tex.

[73] Assignee: Compaq Computer Corporation, Houston, Tex.

[21] Appl. No.: 09/052,390

[22] Filed: Mar. 31, 1998

[51] Int. Cl.[7] .................................................. G06F 1/32
[52] U.S. Cl. .......................................... 713/300; 713/324
[58] Field of Search ............................ 713/330, 300–340

[56] References Cited

U.S. PATENT DOCUMENTS

| | | | |
|---|---|---|---|
| 5,070,473 | 12/1991 | Takano et al. | 710/260 |
| 5,303,171 | 4/1994 | Belt et al. | 713/321 |
| 5,465,367 | 11/1995 | Reddy et al. | 365/222 |
| 5,617,532 | 4/1997 | Ushiyama | 714/36 |
| 5,630,143 | 5/1997 | Maher et al. | 713/310 |
| 5,638,541 | 6/1997 | Sadashivaiah | 713/323 |
| 5,671,424 | 9/1997 | Wisor et al. | 710/269 |
| 5,680,592 | 10/1997 | Priem | 395/527 |
| 5,771,390 | 6/1998 | Walker et al. | 713/330 |
| 5,815,409 | 9/1998 | Lee et al. | 364/528.21 |
| 5,850,559 | 12/1998 | Angelo et al. | 713/320 |
| 5,903,894 | 5/1999 | Reneris | 707/100 |

OTHER PUBLICATIONS

*Advanced Configuration and Power Interface Specification*, Intel/Microsoft/Toshiba, Revision 1.0, Dec. 22, 1996.

*Primary Examiner*—Paul R. Myers
*Attorney, Agent, or Firm*—Conley, Rose & Tayon, P.C.; Michael F. Heim; Jonathan M. Harris

[57] ABSTRACT

An advanced configuration and power interface operating system transparent method to control the wake-to-sleep and sleep-to-wake transitions includes: detecting a sleep enable command; temporarily blocking completion of the sleep enable command; generating an interrupt; configuring an input-output device; and completing the sleep enable command. The sleep enable command can be a write command to an advanced configuration and power interface sleep enable data storage unit. The generated interrupt can be a system management interrupt that invokes a basic input-output device configuration program.

38 Claims, 3 Drawing Sheets

CONTROL OF COMPUTER SYSTEM WAKE/ SLEEP TRANSITIONS

BACKGROUND

The invention relates to controlling the sleep-to-wake and wake-to-sleep state transitions in an advanced configuration and power interface (ACPI) computer system.

Known power management techniques such as advanced power management (APM) are implemented by basic input-output system (BIOS) instructions stored in read-only memory. When a power management or configuration event occurred (e.g., a request to transition from an "on" state to a "sleep" state), the BIOS received notice of the event via an operating system transparent interrupt known as a system management interrupt (SMI). Upon event occurrence, the BIOS communicates the event to the operating system which, after notifying all operating system level device drivers, generated a SMI, returning control to the BIOS. It was the responsibility of the BIOS to manipulate the necessary software state information and to control the necessary hardware to perform the requested action. On wake-up, the BIOS again received notice via a SMI and performed any state restoration actions needed before returning control to the operating system.

Under the newer ACPI, when a power management or configuration event occurs the operating system is notified via an operating system visible interrupt known as a system control interrupt (SCI). It is the operating system itself that directs all system and device power state transitions.

The ACPI specification includes tables, BIOS, and hardware registers. ACPI tables are used to describe system information (e.g., supported power states, power sources, clock sources), features (e.g., available hardware devices), and methods for controlling those features (e.g., ACPI control methods). ACPI BIOS is that part of the computer system firmware that implements the ACPI specified interfaces for sleep, wake, some restart operations, and provides permanent storage of ACPI table information. ACPI registers are used to store and pass event information between the hardware/firmware and an ACPI driver—an operating system level program that directs/coordinates all transitions between working and sleeping states.

The ACPI specification defines a global working state (G0) as that state in which a host processor dispatches and executes user mode (application) threads. In this state, devices (peripherals) may dynamically have their power state changed. The ACPI specification defines a global sleeping state (G1) as that state in which no user mode threads are executed by the host processor. As shown in Table 1, the ACPI specification also defines five types of sleeping states (S1 through S5).

TABLE 1

| Type | Description |
|---|---|
| | ACPI Sleep States |
| S1 | Low wake-up latency state. No system context is lost and hardware maintains all system context. |
| S2 | Similar to S1 except that the operating system is not responsible for maintaining processor or cache context. |
| S3 | Processor and cache context are lost. Hardware maintains memory and some processor configuration context. |
| S4 | It is assumed that hardware has powered off all devices, although platform context is maintained. |
| S5 | Soft off state. Similar to S4 except that no context is saved and no device is enabled to wake the system. A complete boot operation is required to exit the S5 state. |

As shown in FIG. 1, ACPI registers 100 include fixed 102 and general purpose 104 registers. Fixed registers 102 are used to implement ACPI required event handing, e.g., transitions to and from the working and sleeping states. General purpose registers 104 are used to process events generated by value-added hardware, e.g., original equipment manufacturer (OEM) supplied components.

Transitions between the global working state G0 and any one of the supported sleeping states (S1–S5) are controlled by two fields in ACPI fixed register space 102: sleep type (SLP_TYP 106) and sleep enable (SLP_EN 108). To transition from the working state to one of the sleep states the ACPI driver stores the desired sleep state identifier (i.e., S1–S5) into field SLP_TYP 106. When the ACPI driver later asserts field SLP_EN 108, the computer system transitions into the specified sleep state.

While in any of the sleeping states (G1), wake status flag (WAK_STS 110) provides the ACPI driver with a way to detect a wake-up event. Any enabled wake-up event/device may set WAK_STS flag 110. When WAK_STS flag 110 is set, a SCI is generated which allows the ACPI driver to sequence computer system hardware back to the working state.

Under the ACPI specification, the only opportunity a device manufacturer (e.g., OEM) has to set the configuration of a device prior to entering a sleep state is through the ACPI prepare to sleep (_PTS) control method. Under ACPI however, the _PTS routine is not guaranteed to be called at a specific point in the wake-to-sleep operation (e.g., after operating system level drivers have been commanded to sleep), or even that a state transition will occur (an ACPI operating system may cancel a pending wake-to-sleep state transition). For these reasons configuring a device so that it may be controlled, accessed, used, or activated remotely (i.e., remotely managed) through the _PTS control method is difficult.

SUMMARY

In one aspect, the invention provides a method to configure a device that is transparent to an advanced configuration and power interface (ACPI) operating system. The method includes detecting an ACPI sleep enable command, temporarily blocking completion of the sleep enable command, generating an interrupt, configuring the device, and completing the sleep enable command. The sleep enable command can be a write command to an ACPI sleep enable data storage unit. The generated interrupt can be a system management interrupt that invokes a basic input-output device configuration program.

In another aspect, the invention provides a computer system having a bus, a host processor coupled to the bus, an input-output device coupled to the bus, advanced configuration and power interface sleep enable data storage coupled to the bus, a detector coupled to the bus and adapted to detect and postpone a command to write to the sleep enable data storage, a configuration circuit coupled to the detector and adapted to configure the input-output device when the write command is detected and a sleep circuit coupled to the configuration circuit and adapted to complete the postponed command after the input-output device has been configured. The bus can be a proprietary or special purpose bus, a peripheral component interface (PCI) bus, an industry standard architecture (ISA) bus, an extended industry standard architecture (EISA) bus, or a combination of one or more of these busses. The input-output device can be a network interface card, a modem, a printer interface card, and the like. The computer system may include a bus-to-bus bridge circuit, and the bridge circuit can incorporate the sleep enable data storage, detector, configuration, and sleep circuits.

DETAILED DESCRIPTION

Figure 2:
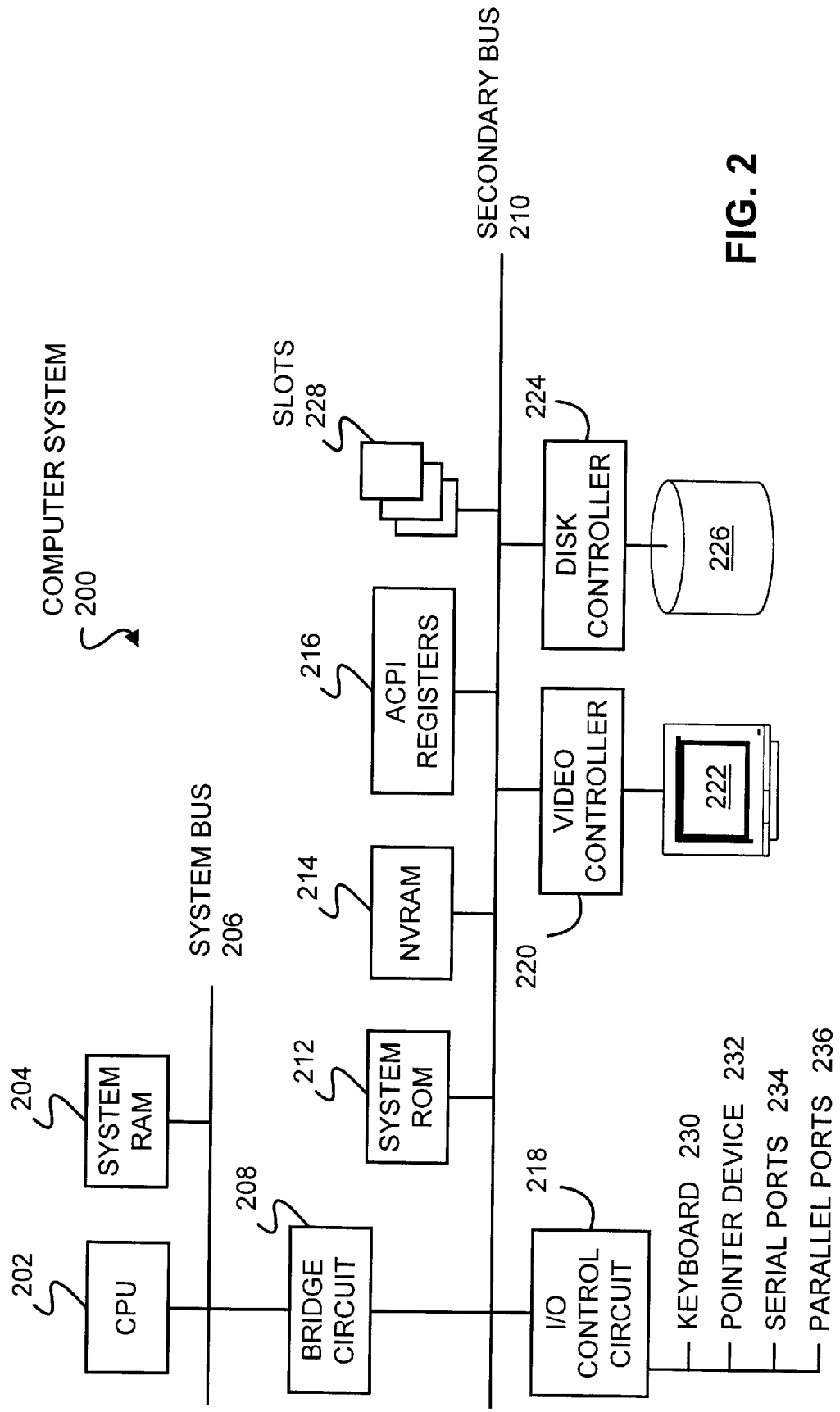
FIG. 2 shows a computer system.

Referring to FIG. 2, an advanced configuration and power interface (ACPI) computer system 200 providing basic input-output system (BIOS) control of working-sleeping state transitions includes host processor (CPU) 202 and random access memory (RAM) 204 coupled to system bus 206. Illustrative host processors 202 include the PENTIUM, PENTIUM PRO, PENTIUM-II, and 80X86 families of processors from Intel Corporation.

Figure 1:
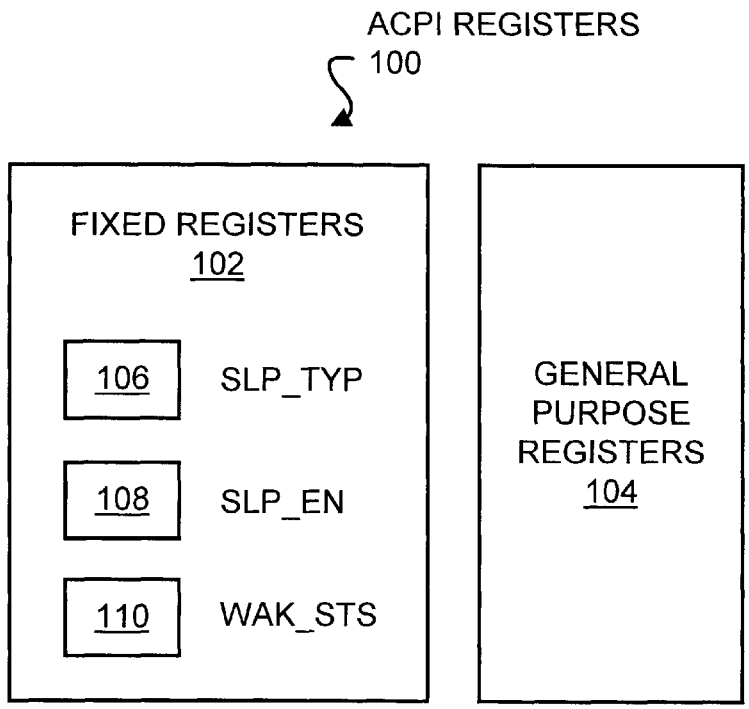
FIG. 1 shows advanced configuration and power interface register space.

Bridge circuit 208 couples system bus 206 to secondary bus 210. Bridge circuit 208 will be described in more detail below. Components coupled to secondary bus 210 include: read only memory (ROM) 212; non-volatile RAM (NVRAM) 214; ACPI registers 216 (see FIG. 1); input-output (I/O) control circuit 218; video controller 220 and associated display 222; disk controller 224 and associated disks (one shown) 226; and one or more expansion slots 228. Expansion slots 228 can, for example, be used to include a network interface card (NIC), modem, or printer control card. Input-output control circuit 218 can provide an interface for user keyboard 230, pointer device 232, and serial 234 and parallel 236 ports.

Figures 3, 4:
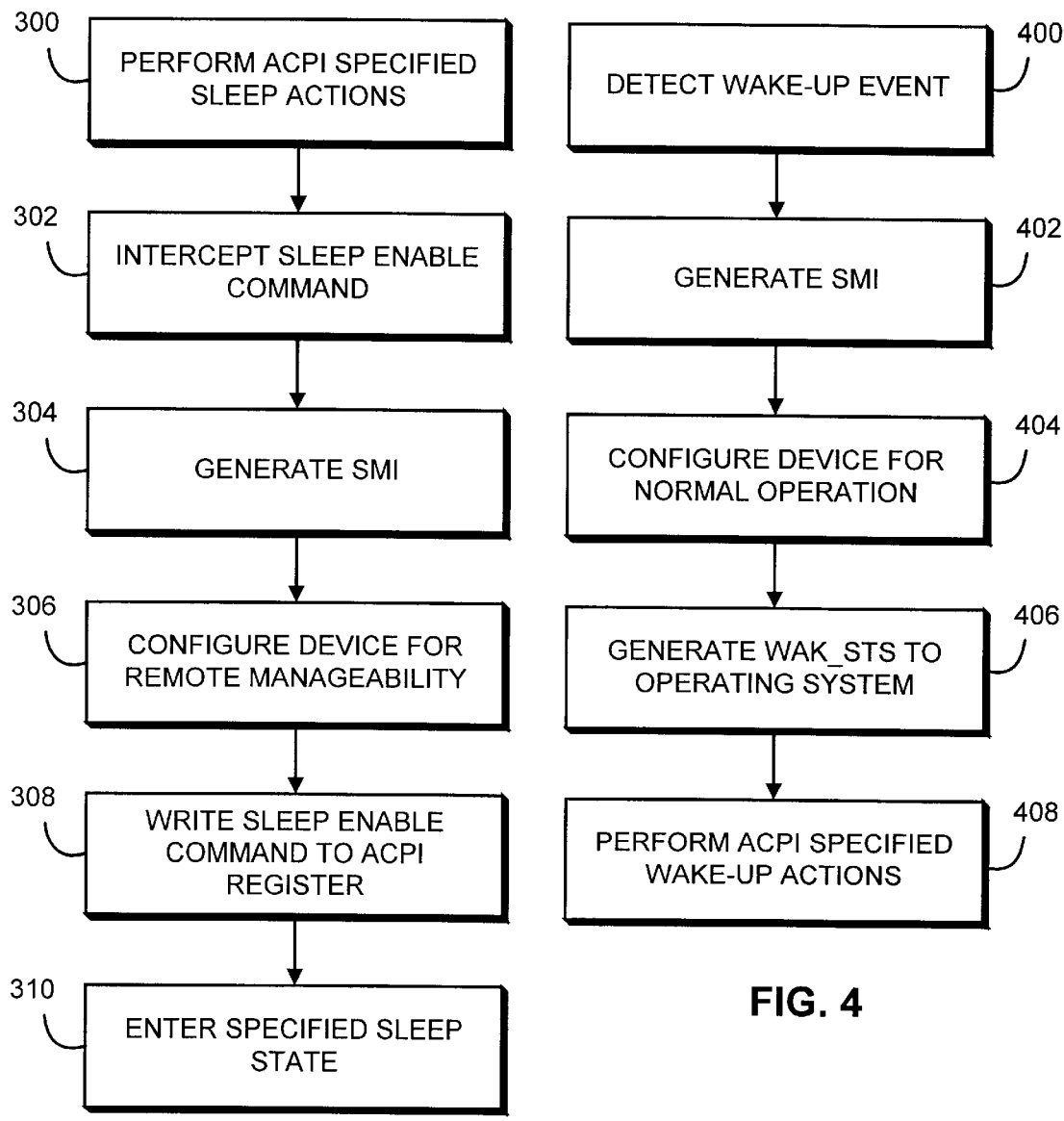
FIG. 3 shows a working to sleep state transition method.
FIG. 4 shows a sleeping to wake state transition method.

Generally, if a device such as a NIC or modem is placed into a state capable of responding to a remote wake-up signal, it cannot then respond to routine commands issued to it by host processor 202 (i.e., it is hung) should an ACPI operating system cancel the putative wake-to-sleep transition. FIG. 3 shows a wake-to-sleep process that can configure a device immediately prior to, and when it is certain that, computer system 200 will enter a sleep state. The wake-to-sleep process of FIG. 3 is transparent to an ACPI operating system.

When transitioning from the global working state to any supported sleep state the ACPI driver performs its normal sequence of actions as specified in the "Advanced Configuration and Power Interface Specification, section 9: Waking and Sleeping," dated Dec. 22, 1996 (step 300). Step 300 includes writing (storing) the desired sleep state identifier into field SLP_TYP 106 of ACPI registers 216. However, when the ACPI driver later attempts to initiate the specified sleep mode by asserting field SLP_EN 108, this data/command is intercepted (step 302) and an operating system transparent system management interrupt (SMI) is generated (step 304). The SMI causes program code to execute which configures the target device for remote manageability (step 306). Upon completing device configuration the SLP_EN field 108 is asserted at step 308 (the operation previously intercepted, step 302) which causes computer system 200 to enter the specified sleep state (step 310).

Referring to FIG. 4, transition from a sleep state to the global working state is initiated when the WAK_STS flag 110 is set (step 400). WAK_STS flag 110 may be set by any event/device so enabled by the operating system such as a keyboard or a peripheral device like a modem. Setting of the WAK_STS flag 110 triggers generation of a SMI (step 402) which, in turn, causes program code to execute that configures the target device for normal working state operations (step 404). Upon completing device configuration, the ACPI operating system is notified of the change in WAK_STS flag 110 state via a SCI (step 406). Following SCI generation, the ACPI driver performs its normal wake-up sequence (step 408).

Implementing the methods of FIGS. 3 and 4 requires a means to: (1) detect and intercept when the ACPI driver attempts to assert the SLP_EN field; (2) generate and respond to a SMI; and (3) generate a wake-up SCI. In addition, program code (typically BIOS instructions) must be written to perform the desired configuration actions (steps 306 and 404). Program code will vary from device to device, e.g., a NIC versus a modem. An independent hardware component can be designed to perform these tasks, or bridge circuit 208 may be modified to perform the same tasks. If an independent hardware component is used, it should be located in the path between system bus 206 and ACPI registers 216.

Figure 5:
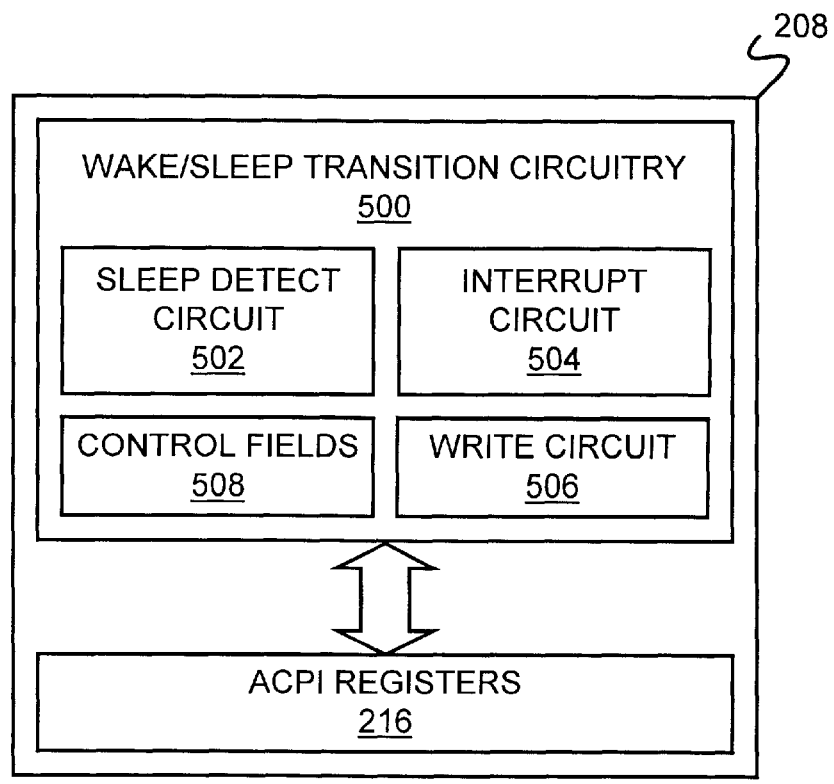
FIG. 5 shows a bridge circuit.

Referring to FIG. 5, in one embodiment of computer system 200 ACPI registers 216 and wake/sleep transition circuitry 500 are located within bridge circuit 208. Sleep detect circuit 502 determines when ACPI register 216's SLP_EN field is being asserted. Interrupt circuit 504 generates SMI and SCI interrupt signals as indicated in FIGS. 3 and 4. Write circuit 506 asserts the SLP_EN field to complete a wake-to-sleep transition. Control fields 508 are used by the sleep detect 502, interrupt 504, and write 506 circuits. As shown in Table 2, four control fields can be used to control the operation of wake/sleep transitions. The same, or functionally equivalent, fields can be used if a separate device is provided to implement the invention.

TABLE 2

Wake/Sleep Transition Control Fields

| Field | Description |
|---|---|
| SLP_SMI_EN | When set, transition from working to any sleep state sets SLP_SMI_STS and causes generation of a SMI. |
| SLP_SMI_STS | Set by transition from the working state to any sleep state when SLP_SMI_EN is set. Cleared when a wake-up signal is received, e.g., when the WAK_STS flag indicates a wake-up event. |
| WAK_SMI_EN | When set, transition from any sleep state to the working state sets WAK_SMI_STS and causes generation of a SMI. |

TABLE 2-continued

Wake/Sleep Transition Control Fields

| Field | Description |
|---|---|
| WAK_SMI_STS | Set by transition from a sleeping state to the working state when WAK_SMI_EN is set. Cleared when a wake-up signal is received, e.g., when the WAK_STS flag indicates a wake-up event. |

One benefit of the state transition methods illustrated in FIGS. 3 and 4 is that any device whose configuration requires computer system 200 to enter a sleep state can be accommodated. Another benefit is that the remote manageability configuration actions (steps 306 and 404) are transparent to the ACPI operating system.

The foregoing description is illustrative only and is not to be considered limiting. Various changes in the materials, components, circuit elements, as well as in the details of the illustrated operational methods are possible without departing from the scope of the claims. For example, system bus 206 and secondary bus 210 can be proprietary or special purpose buses, peripheral component interface (PCI) buses, industry standard architecture (ISA) buses, extended industry standard architecture (EISA) buses, or combinations of one or more of these busses. A bridge circuit modified in accordance with the invention can be implemented in discrete logic on a printed circuit card or incorporated within a specially designed application specific integrated circuit (ASIC). Similarly, a hardware component independent of bridge circuit 208 can be implemented as a collection of discrete logic units or incorporated into an ASIC. Steps of the invention may be performed by a computer processor executing instructions organized into a program module or a custom designed state machine. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A computer system comprising:
   a bus;
   a host processor operatively coupled to the bus;
   an input-output device operatively coupled to the bus;
   advanced configuration and power interface sleep enable data storage operatively coupled to the bus;
   a detector operatively coupled to the bus and adapted to detect and postpone a command to write to the sleep enable data storage;
   a configuration circuit operatively coupled to the detector and adapted to configure the input-output device when the write command is detected; and
   a sleep circuit operatively coupled to the configuration circuit and adapted to complete the postponed command after the input-output device has been configured.

2. The computer system of claim 1, wherein the bus comprises an industry standard architecture bus.

3. The computer system of claim 1, wherein the bus comprises a peripheral component interface bus.

4. The computer system of claim 1, wherein the input-output device comprises a network interface device.

5. The computer system of claim 1, wherein the input-output device comprises a modem.

6. The computer system of claim 1 further comprising a bridge circuit having a first connection and a second connection, wherein the first connection operatively couples the bus to the bridge circuit and the second connection operatively couples the bridge circuit to a second bus.

7. The computer system of claim 6, wherein the second bus comprises a peripheral component interface bus.

8. The computer system of claim 6, wherein the bridge circuit operatively couples the input-output device to the bus.

9. The computer system of claim 6, wherein the sleep enable data storage is within the bridge circuit.

10. The computer system of claim 9, wherein the bridge circuit comprises an application specific integrated circuit.

11. The computer system of claim 1, wherein the configuration circuit generates a system management interrupt signal.

12. The computer system of claim 11, wherein the system management interrupt signal invokes a basic input-output system device configuration program.

13. The computer system of claim 1, wherein the configuration circuit comprises basic input-output system program code.

14. A computer system comprising:
   a first bus;
   a second bus;
   a host processor operatively coupled to the first bus;
   an input-output device operatively coupled to the second bus;
   a bridge circuit having:
      a first connector operatively coupled to the first bus,
      a second connector operatively coupled to the second bus,
      advanced configuration and power interface sleep enable data storage operatively coupled to the first connector,
      a detector operatively coupled to the first connector and adapted to detect and postpone a command to write to the sleep enable data storage;
      a configuration circuit operatively coupled to the detector and adapted to configure the input-output device when the write command is detected, and
      a sleep circuit operatively coupled to the configuration circuit and adapted to complete the postponed command after the input-output device has been configured.

15. The computer system of claim 14, wherein the first bus comprises an industry standard architecture bus.

16. The computer system of claim 14, wherein the first bus comprises a peripheral component interface bus.

17. The computer system of claim 14, wherein the second bus comprises an industry standard architecture bus.

18. The computer system of claim 14, wherein the second bus comprises a peripheral component interface bus.

19. The computer system of claim 14, wherein the input-output device comprises a network interface device.

20. The computer system of claim 14, wherein the input-output device comprises a modem.

21. The computer system of claim 14, wherein the configuration circuit generates a system management interrupt signal.

22. The computer system of claim 21, wherein the system management interrupt signal invokes a basic input-output system device configuration program.

23. A method of configuring a device in a computer system that is transparent to an advanced configuration and power interface operating system, the method comprising:

detecting a sleep command;

temporarily blocking completion of the sleep command;

generating a system management interrupt;

configuring the device to be active while the computer system is in a sleep state; and completing the sleep command by writing to an advanced configuration and power interface sleep enable data storage unit.

24. The method of claim 23, wherein the device comprises a network interface card.

25. The method of claim 23, wherein the device comprises a modem.

26. A method of configuring a device that is transparent to an advanced configuration and power interface operating system, the method comprising:

detecting a sleep command that comprises a write command to an advanced configuration and power interface sleep enable data storage unit;

temporarily blocking completion of the sleep command;

generating an interrupt;

configuring the device; and completing the sleep command by writing to an advanced configuration and power interface sleep enable data storage unit.

27. The method of claim 26 wherein the system management interrupt invokes a basic input-output system device configuration program.

28. The method 27, wherein the device configuration program is stored in a programmable read only memory.

29. A method of configuring a device that is transparent to an advanced configuration and power interface operating system, the method comprising:

detecting a sleep command;

temporarily blocking completion of the sleep command;

generating an interrupt;

configuring the device; and completing the sleep command by writing to an advanced configuration and power interface sleep enable data storage unit.

30. A method of configuring a device that is transparent to an advanced configuration and power interface operating system, the method comprising:

detecting a write command to an advanced configuration and power interface sleep enable data storage unit;

temporarily blocking completion of the detected write command;

generating a system management interrupt to invoke basic input-output system program code;

executing the basic input-output system program code to configure a device; and completing the write command by writing to the advanced configuration and power interface sleep enable data storage unit.

31. The method of claim 30, wherein the device comprises a network interface card.

32. The method of claim 30, wherein the device comprises a modem.

33. The method of claim 30, wherein the device configuration program code is stored in a programmable read only memory.

34. An apparatus comprising:

means for detecting a write command to an advanced configuration and power interface sleep enable register;

means for postponing completion of the detected write command;

means for executing a device configuration program; and means for completing the write command after the device configuration program has completed configuring a device.

35. The apparatus of claim 34, wherein the means for detecting a write command comprises an address recognition circuit designed to detect an address associated with the sleep enable register.

36. The apparatus of claim 34, wherein the means for executing a device configuration program comprises generating a system management interrupt to invoke a basic input-output system device configuration routine.

37. The apparatus of claim 34, wherein the apparatus is an integrated circuit.

38. The apparatus of claim 37, wherein the integrated circuit is an application specific integrated circuit.

* * * * *